Aug. 18, 1964 W. G. WADEY ETAL 3,145,386
INFORMATION STORAGE DEVICE
Filed Feb. 16, 1962

INVENTORS
REGINALD TICKELL
WALTER G. WADEY

BY Edward M. Farrell
ATTORNEY

United States Patent Office 3,145,386

Patented Aug. 18, 1964

3,145,386

INFORMATION STORAGE DEVICE

Walter G. Wadey, Wynnewood, and Reginald Tickell, Fort Washington, Pa., assignors to Sperry Rand Corporation, New York, N.Y., a corporation of Delaware Filed Feb. 16, 1962, Ser. No. 173,647
5 Claims. (Cl. 346—74)

This invention relates to magnetic storage devices, and more particularly to magnetic drums.

The general theory of magnetic recording on the periphery of a drum is well known, particularly in the computer art. The periphery of a cylindrical drum is provided with a coating of magnetizable material. One or more magnetic transducers are mounted in close proximity to the periphery of the drum. The drum is rotated about its axis exposing its coating to the transducers during a writing operation. The transducers create in the coating a circular line or track of spots of remanent magnetism, each spot representing a bit of information. During a reading operation the transducers pick up the information recorded on the drum.

The diameter of the drum determines the number of bits of information per track which may be recorded for a given allowable bit density. The length of the drum determines the number of tracks that may be recorded for a given allowable track density. Consequently, the storage capacity of a drum is proportional to the area of its periphery and its storage capacity cannot be increased other than by increasing its dimensions. An increase in the dimensions of a magnetic drum, however, results necessarily in an increase in the windage losses. Also the access time, that is the time needed to recover information, increases with the recording area of the drum. The windage losses require a higher power outlay. Excessive access time is obviously an undesirable feature of any storage medium.

It is accordingly an object of the invention to provide a magnetic storage device of large capacity.

It is a further object of this invention to provide a magnetic storage device of large capacity within a relatively small space.

It is a still further object of the invention to provide a magnetic storage device of large capacity with small windage losses.

It is still a further object of the invention to provide a magnetic storage device of large capacity in which the access time is minimized.

It is still a further object of the invention to provide a magnetic drum memory, the capacity of which may be extended.

The storage device according to the invention includes a plurality of hollow cylinders or drums supported in concentrical spaced relationship by a common drive shaft. Each drum is provided with a coating of magnetizable material. Access to the drums for writing and reading information may be obtained by means of one or more magnetic transducers capable of perpendicular and parallel motion with respect to the axis of rotation of the drums.

Further objects and advantages of the invention will be apparent to those skilled in the art from the following description and the accompanying drawings in which.

Figure 1:
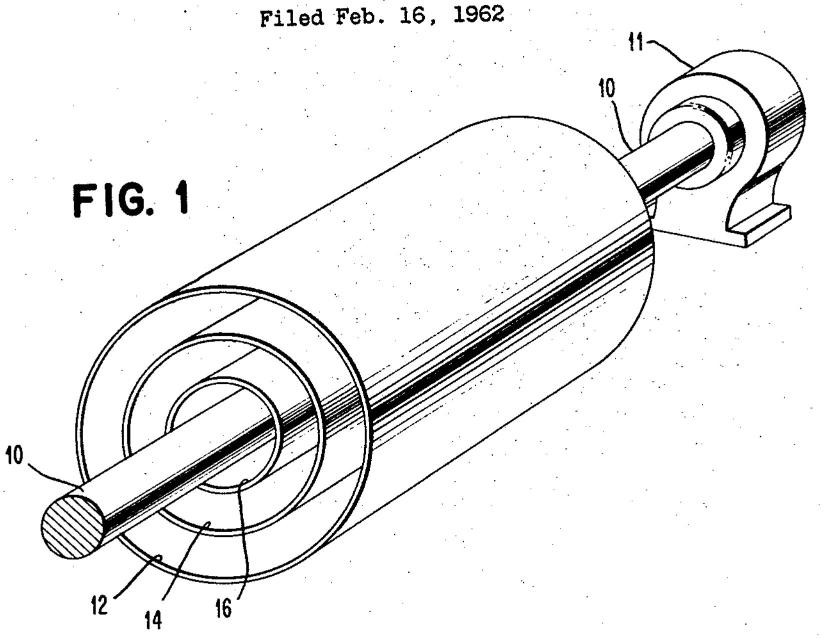
FIG. 1 illustrates a perspective view of a magnetic storage device according to the invention.
Figure 2:
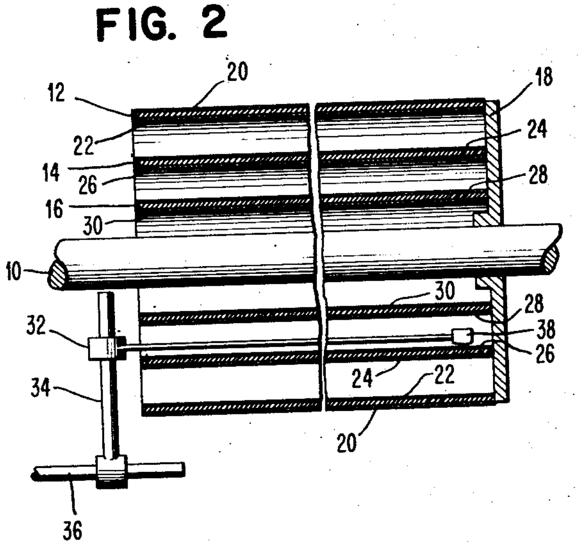
FIG. 2 illustrates a view of a longitudinal cross-section of the device of FIG. 1.

Referring particularly to FIGS. 1 and 2 of the drawing, a drive shaft 10, properly journalled and driven by motor 11 for rotation purposes, is surrounded by three cylindrical drums 12, 14 and 16. Each of the drums 12, 14 and 16 comprises a hollow cylinder attached at one extremity to a mounting plate 18. The mounting plate 18 may be firmly attached to the drive shaft 10 by suitable well-known means, such as a key and key-way connection, welding, etc. The drums may be suitably attached to the mounting plate 18 by welding, screw mounting or other means. In the particular embodiment illustrated, each of the drums 12, 14 and 16 is provided with a magnetic recording surface on both its inner and outer periphery by the application of a coating of magnetizable material. The drum 12, for example, may be provided with coatings 20 and 22; the drum 14 with coatings 24 and 26, and the drum 16 with coatings 28 and 30.

It is seen that the arrangement illustrated has provided a number of drums of different diameter concentrically and co-extensively disposed with respect to each other. Thus, instead of a single drum occupying a certain space, as in the prior art, a number of drums are included in the same space. With the increased number of drums within the same space, it is possible to greatly increase the storage capacity of a storage system involving magnetic drums in a computer without increasing the space requirements for the computer.

In utilizing the tiered storage drums system of the present invention, a compatible transducer positioning arrangement must of course be employed. One such arrangement is illustrated in FIG. 2. A supporting arm 32 is slidable along a guiding arm 34, extending perpendicularly with respect to the drive shaft 10. The guiding arm 34 is slidable over a guiding bar 36 in a direction parallel to the drive shaft 10.

The supporting arm 32 carries at its free end a magnetic transducer 38. Suitable means, not illustrated in the drawing, may be provided to selectively move the supporting arm 32 along the guiding arm 34 so that the transducer 38 may become aligned with a selected recording surface of a selected drum. Suitable means, not illustrated in the drawing, may also be provided to selectively move the arm 34 along the guiding bar 36 so that the transducer 38 may be aligned with a selected track of the selected drum.

It will be understood that in the device according to the invention, a greatly increased storage capacity is obtained in the same volume of space occupied by one single drum, i.e. the outermost drum. Consequently the windage losses are equal to those of the outermost drum only. Further, because of the high information storage density per unit volume of space, the access time is short since this time is mainly determined by the travel time of a transducer in searching action.

It will be understood that, although the drawing shows an arrangement with three concentric drums, arrangements having more drums may be used. One factor which determines the number of drums for an arrangement with an outer drum of given diameter, is the spacing required between two adjacent drums in connection with the room needed by the transducers and their motions. Another determining factor is the minimum diameter of the innermost drum, this diameter being determined by the allowable maximum circular recording density at a given peripheral speed and signal frequency.

The number of transducers used with the present invention may exceed one. For example, one transducer may be provided for each drum, each transducer being movable with respect to its pertaining drum, independent of the other transducers.

Further, a transducer as indicated by transducer 38 may actually comprise a double transducer with one transducer cooperating with the outer periphery of a drum and the other transducer cooperating with the inner periphery of the adjacent drum of larger diameter.

Figure 3:
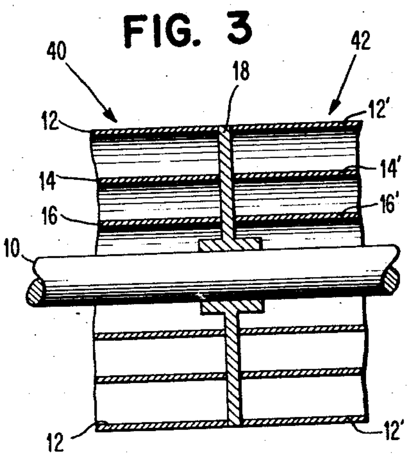
FIG. 3 illustrates in cross-section a further embodiment of a storage device according to the invention.

In order to double the capacity of a storage device as described so far, a second set of magnetic drums may be mounted to the same mounting plate. Such a double set of drums is illustrated in FIG. 3. Like parts are indicated by like reference numerals as in FIGS. 1 and 2. FIG. 3 illustrates how the mounting plate 18 carries two sets of hollow magnetic drums indicated as 40 and 42. Set 40 comprises the drums 12, 14 and 16, set 42 the drums 12', 14' and 16'. Both sets of drums are supported by the mounting plate 18 with set 40 being disposed to the left and set 42 being disposed to the right.

It will be understood that means to support and move the magnetic transducers as described in detail above are provided for each set of drums.

What we claim is:

1. A magnetic storage device comprising a plurality of substantially cylindrical hollow bodies of different diameter, said bodies being arranged in concentric spaced relationship, said bodies being adapted to receive magnetic information thereon.

2. A magnetic storage device comprising a drive shaft, a plurality of substantially cylindrical hollow bodies of different diameter, said bodies being supported by said shaft in concentric spaced relationship, said bodies being adapted to receive magnetic recordings thereon.

3. A magnetic storage device comprising a drive shaft, supporting means mounted on said drive shaft, a plurality of substantially cylindrical hollow bodies of different diameter, said bodies being supported by said supporting means in substantial concentric spaced relationship with respect to said drive shaft, said cylindrical bodies being adapted to receive magnetic recordings thereon.

4. A magnetic storage device comprising a drive shaft, a supporting member mounted on said drive shaft, a plurality of hollow cylinders arranged in concentric spaced relationship around said shaft, each of said cylinders having two extremities and an inner and an outer periphery, each of said cylinders being supported at one of its extremities by said supporting member, each of said cylinders further being provided with a coating of magnetizable material on its inner and outer periphery, and drive means to rotate said drive shaft about its axis.

5. A magnetic storage device comprising a drive shaft, a supporting member mounted on said drive shaft, a first plurality of hollow cylinders arranged in concentric spaced relationship around said shaft and at one side of said supporting member, a second plurality of hollow cylinders arranged in concentric spaced relationship around said shaft and at the other side of said supporting member, each cylinder of said first and second plurality of cylinders having two extremities and an inner and an outer periphery, each cylinder of said first and second plurality of cylinders being supported at one of its extremities by said supporting member, each of said cylinders of said first and second plurality of cylinders further being provided with a coating of magnetizable material on its inner and outer periphery and drive means to rotate said drive shaft about its axis.

References Cited in the file of this patent

UNITED STATES PATENTS

| | | |
|---|---|---|
| 1,227,023 | Underhill | May 22, 1917 |
| 2,800,642 | May | July 23, 1957 |
| 3,001,850 | Marrs | Sept. 26, 1961 |

Notice of Adverse Decision in Interference

In Interference No. 95,011 involving Patent No. 3,145,386, W. G. Wadey and R. Tickell, INFORMATION STORAGE DEVICE, final judgment adverse to the patentees was rendered Feb. 4, 1966, as to claims 1, 2, 3 and 4.

[*Official Gazette May 17, 1966.*]